April 21, 1959  N. S. BARLAMENT ET AL  2,883,121
ENDLESS CONVEYOR HAVING WEB REWINDER CORE SHAFTS
Filed Oct. 24, 1955  9 Sheets-Sheet 1

INVENTORS
NORVAL S. BARLAMENT
SAMUEL J. CAMPBELL
BY Wheeler, Wheeler + Wheeler
ATTORNEYS

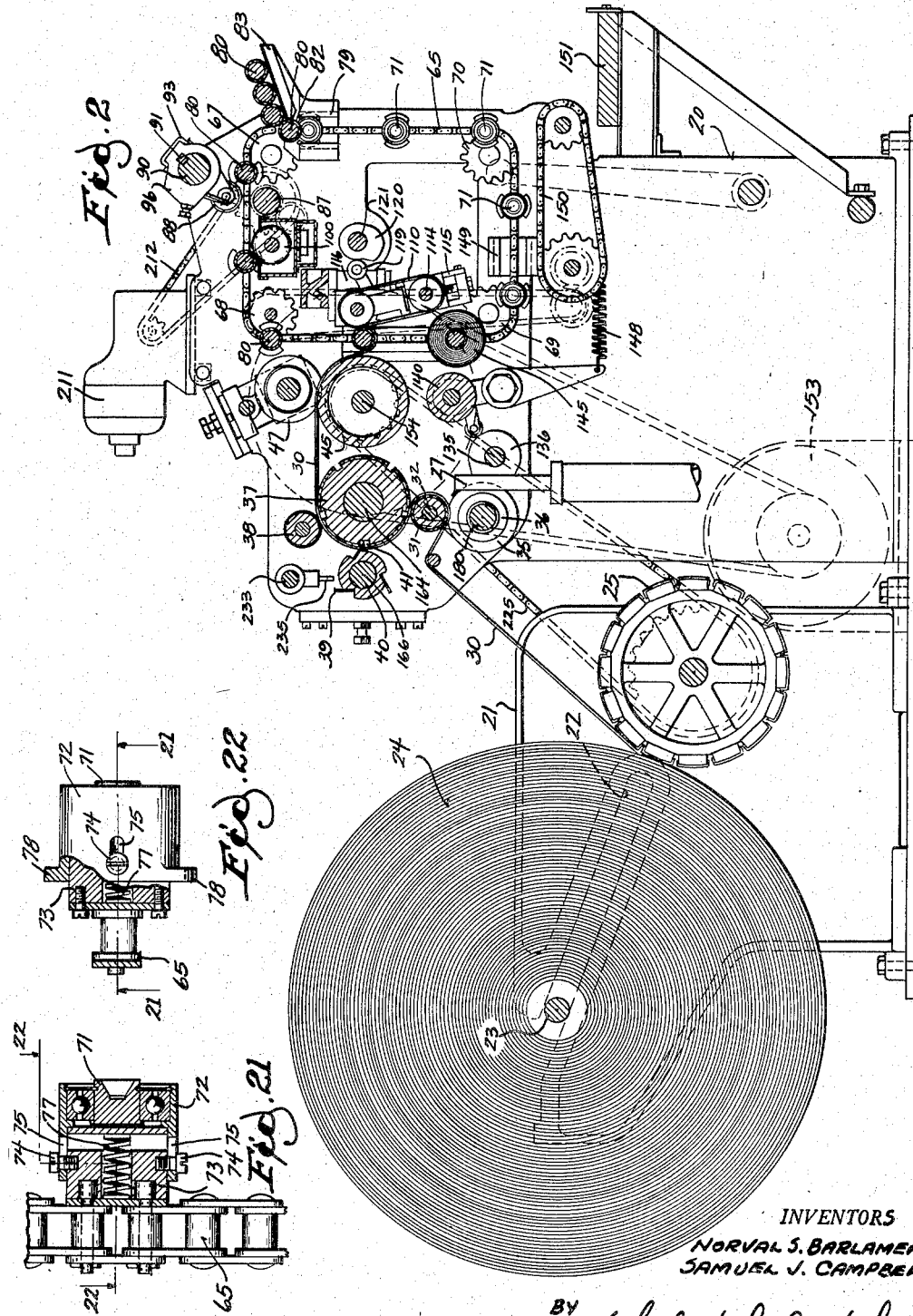

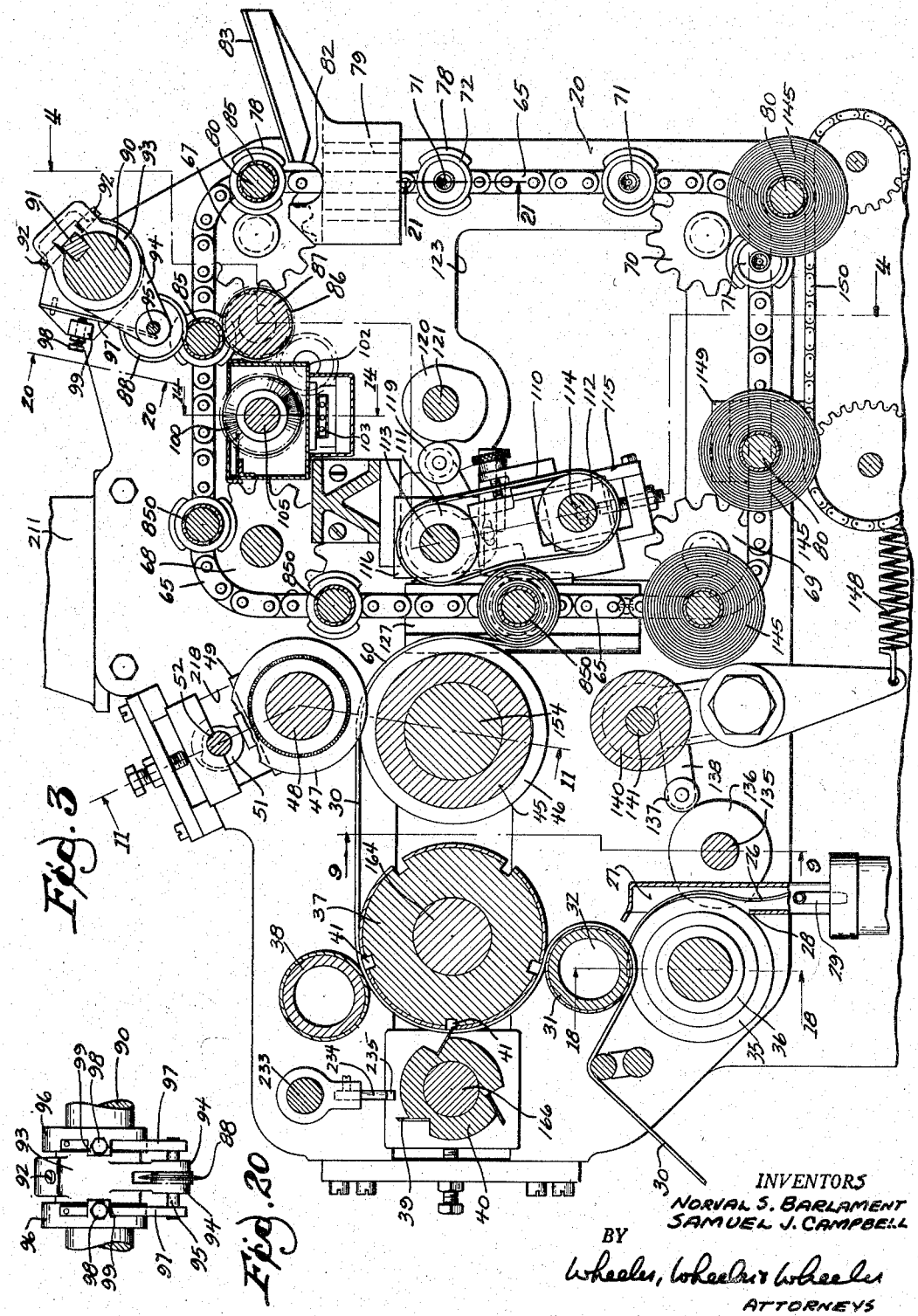

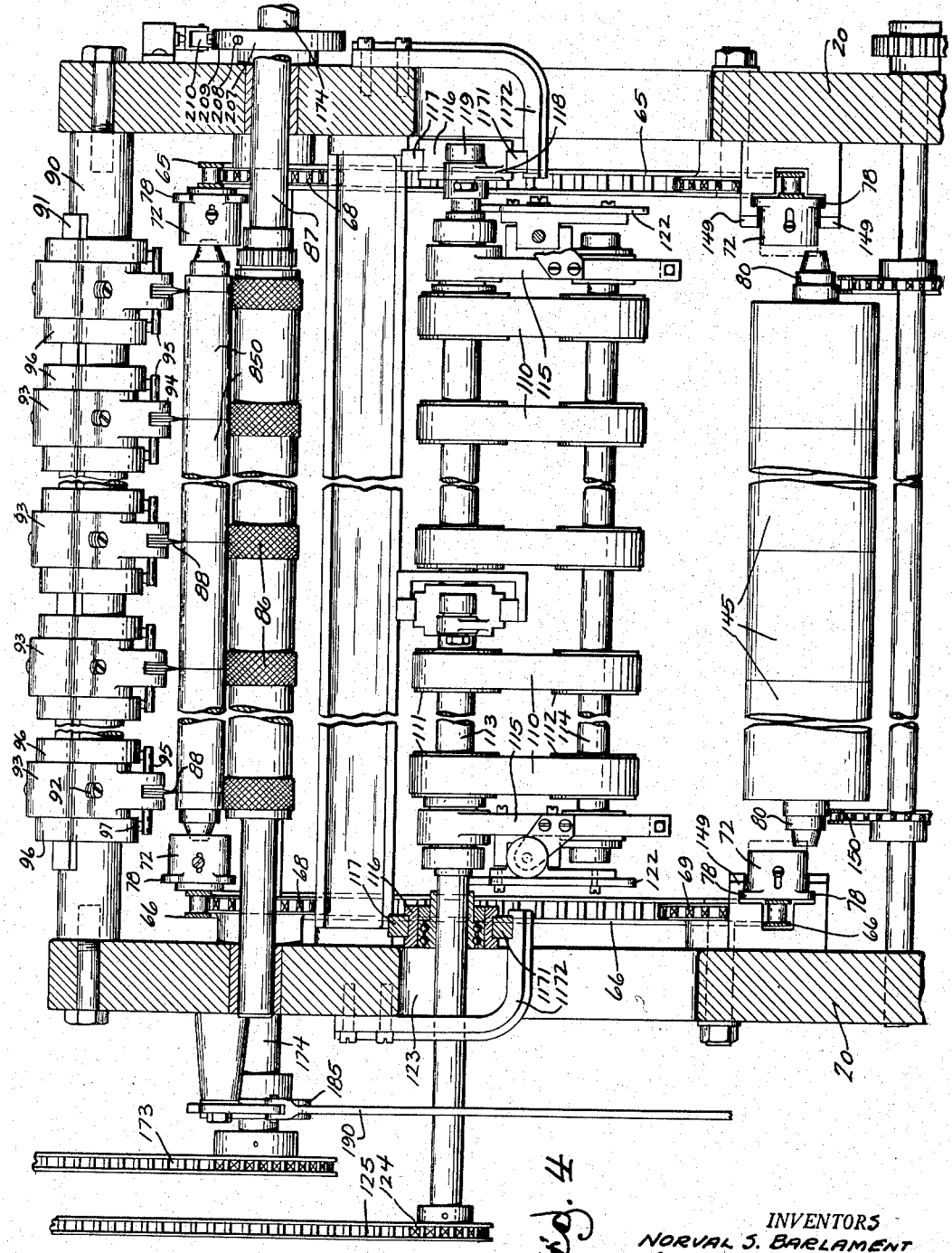

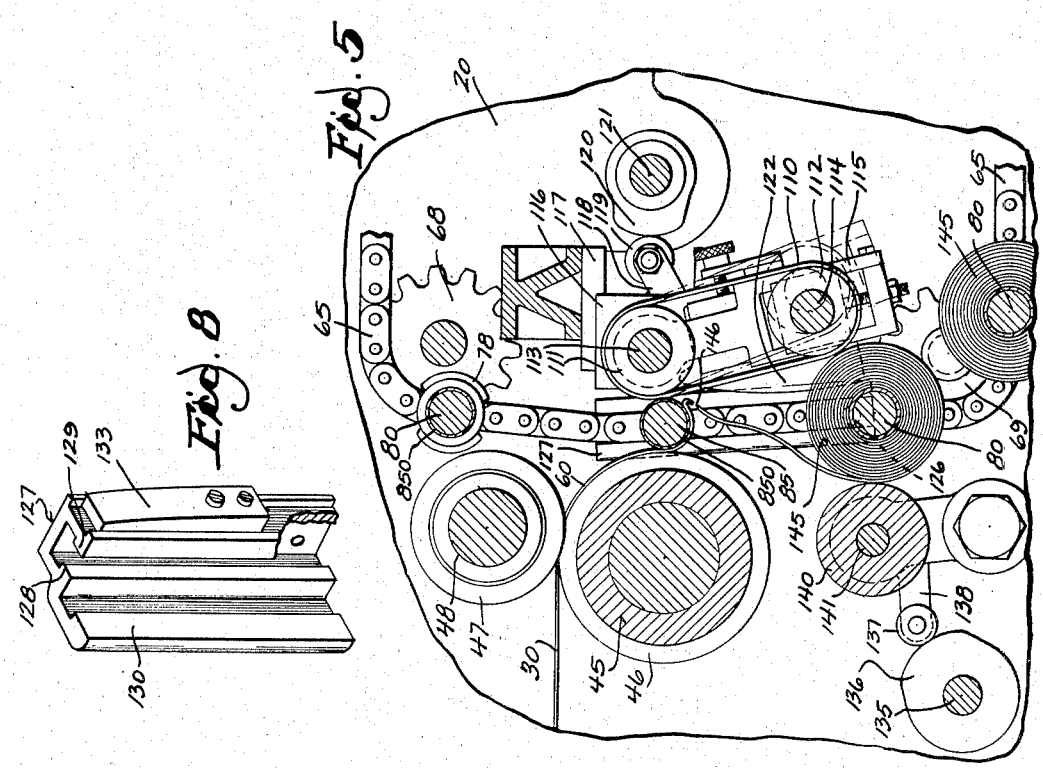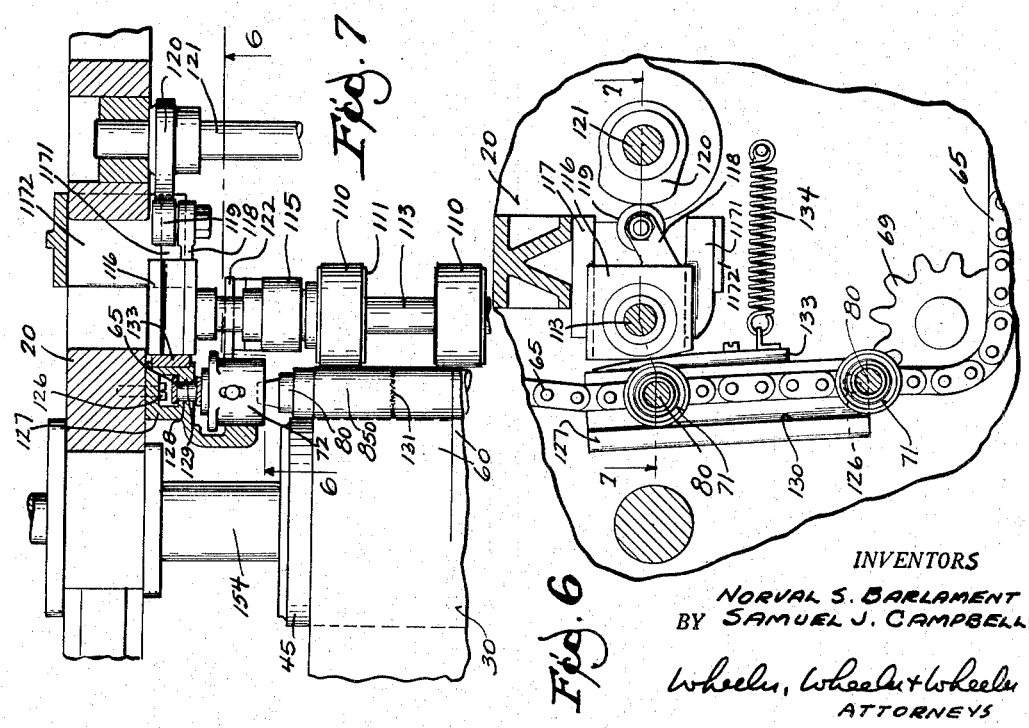

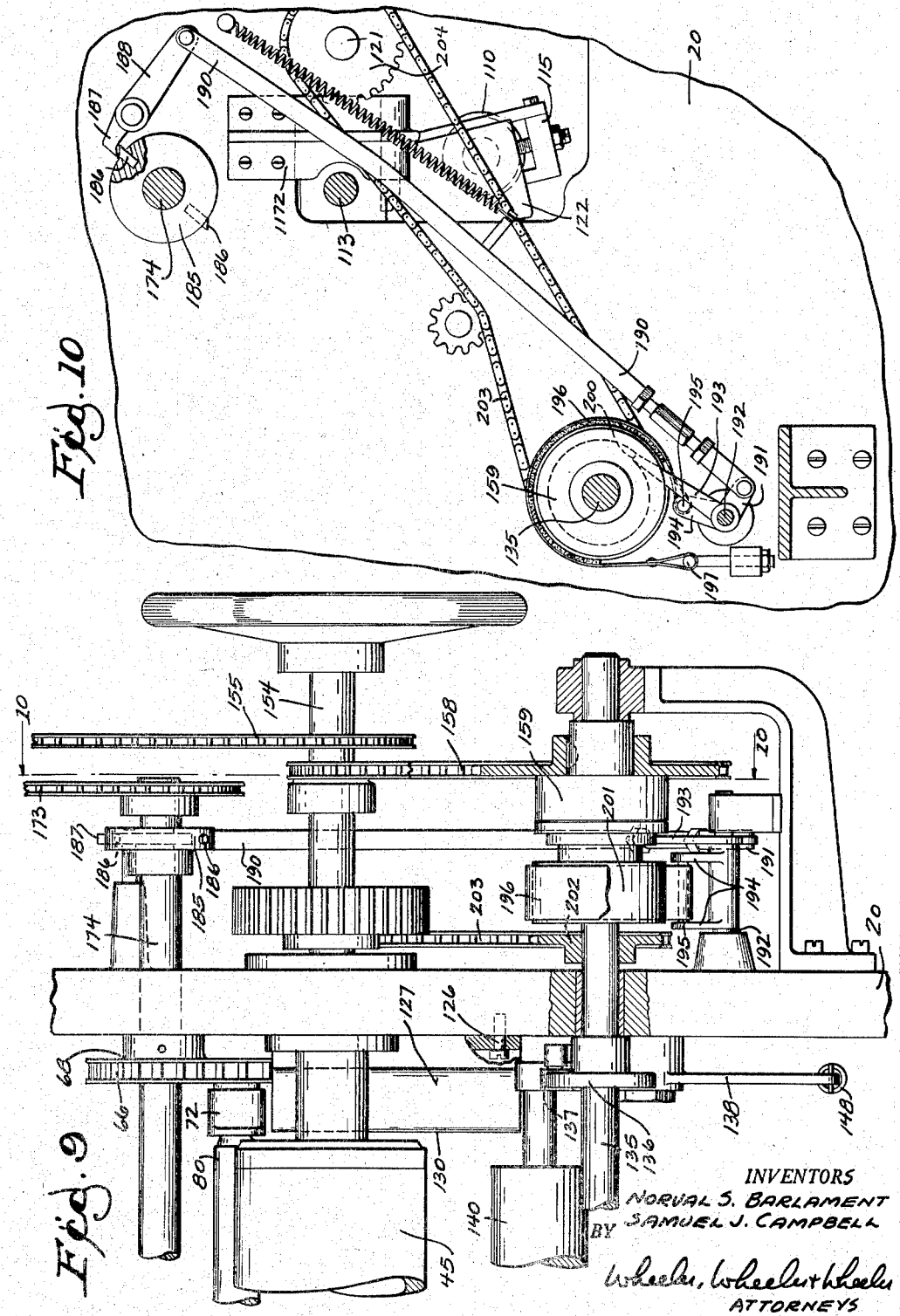

April 21, 1959  N. S. BARLAMENT ET AL  2,883,121
ENDLESS CONVEYOR HAVING WEB REWINDER CORE SHAFTS
Filed Oct. 24, 1955  9 Sheets-Sheet 7

INVENTORS
NORVAL S. BARLAMENT
BY SAMUEL J. CAMPBELL

Wheeler, Wheeler & Wheeler
ATTORNEYS

April 21, 1959   N. S. BARLAMENT ET AL   2,883,121
ENDLESS CONVEYOR HAVING WEB REWINDER CORE SHAFTS
Filed Oct. 24, 1955   9 Sheets-Sheet 8

INVENTORS
NORVAL S. BARLAMENT
SAMUEL J. CAMPBELL
BY
Wheeler, Wheeler & Wheeler
ATTORNEYS

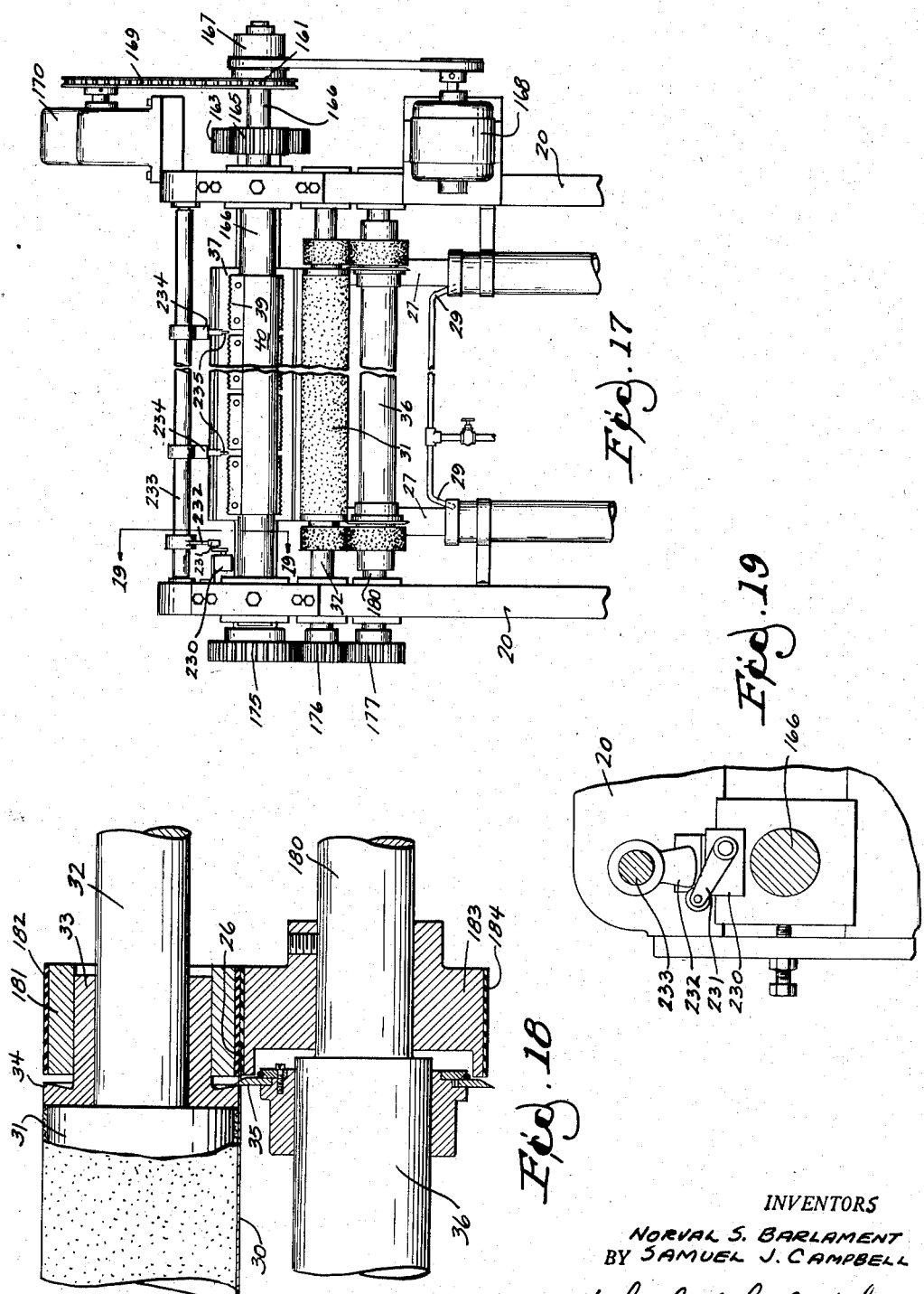

United States Patent Office 2,883,121
Patented Apr. 21, 1959

2,883,121

ENDLESS CONVEYOR HAVING WEB REWINDER CORE SHAFTS

Norval S. Barlament and Samuel J. Campbell, Green Bay, Wis., assignors to Hudson-Sharp Machine Company, Green Bay, Wis., a corporation of Wisconsin Application October 24, 1955, Serial No. 542,248

15 Claims. (Cl. 242—56)

This invention relates to improvements in an endless conveyor web rewinder as exemplified in a toilet roll machine.

The core shaft mandrels upon which core tubes are mounted are automatically picked up by appropriate chucks mounted on endless conveyor chains at opposite sides of the machine frame. As the loaded core shafts advance with the chains, the cores are cut to subdivide them into lengths appropriate for the desired rolls. The tubular cores than pass over a glue pot where they are coated with hot glue.

In the course of their further advance, the glue-coated cores pick up individual webs slit from the broad web supplied by a parent roll. These webs have previously been feeding onto the peripheries of rolls substantially completed on the previous core shaft or mandrel. Just as the freshly glued cores reach the respective webs, they are pushed bodily laterally into contact with the webs while, at the same time, enough tension is exerted on the webs between the completed rolls and the empty cores so that the webs break and begin to wind on the empty cores.

Winding is done by means of belts mounted on a belt frame and directly engaging the peripheries of the rolls and operating over upper pulleys on a shaft which is carried in slides reciprocable in horizontal ways toward the path of the empty cores. The belts operate at their lower ends over pulleys mounted on a shaft suspended obliquely below the shaft first mentioned and biased by gravity toward the rolls which are being wound. As the rolls increase in size, the winding belts can swing outwardly to accommodate the increase and when the time for transfer comes, the upper pulleys are pushed inwardly toward the newly arriving empty cores at the same time that a bumping device acts through the finished rolls to swing the lower end of the belt frame outwardly and thus momentarily to disengage the belts and arrest the movement of the completed rolls to effect web breakage.

Continued movement of the conveyor chains removes from the winding zone the rolls that have been completed and ultimately releases the core shafts in order that the fully-wound rolls can be discharged on an appropriate conveyor or otherwise.

There are various detailed improvements including the heated glue pot in a particular organization; the core slitting roll mounting; the guards or stops which intervene between the knives of the perforator and preclude "winding" in the event of paper breakage; the use of a special trimmer in which waste is carried by suction through a housing which cooperates as a doctor blade to preclude adherence of trim to the cooperating roll; a single revolution clutch which controls the web transfer from the belt-wound roll to the empty core as above described; and the mounting of the pulleys for the winding belts. These and other features can best be described by reference to the accompanying drawings in which:

Fig. 2 is a view of the apparatus in longitudinal section.

Fig. 3 is an enlarged detail view in longitudinal section showing the partially wound roll advanced beyond the position in which winding had commenced in Fig. 2.

Fig. 4 is a vertical cross section taken on line 4—4 of Fig. 3.

Fig. 5 is a further enlarged fragmentary detail view of the parts in the winding zone as shown in longitudinal section similar to Fig. 2 but illustrating the position of the parts at the time of transfer.

Fig. 6 is a view taken in section on the line 6—6 of Fig. 7 through parts of the winding zone.

Fig. 7 is a detail view taken in section on the line 7—7 of Fig. 6.

Fig. 8 is a fragmentary detail view in perspective of one of the chain guides, one portion being broken away.

Fig. 9 is a view taken in section on the line 9—9 of Fig. 3.

Fig. 10 is a view taken in section on the line 10—10 of Fig. 9.

Fig. 11 is a view taken in section on line 11—11 of Fig. 3.

Fig. 12 is a fragmentary detail view taken in section on the line 12—12 of Fig. 11.

Fig. 13 is a fragmentary detail view similar to Fig. 11 showing the parts slightly separated for threading the web through the machine.

Fig. 14 is a view taken in section on the line 14—14 of Fig. 3.

Fig. 15 is a view taken in section on the line 15—15 of Fig. 14.

Fig. 16 is a view taken in section on the line 16—16 of Fig. 14.

Fig. 17 is a fragmentary end elevation of the machine.

Fig. 18 is an enlarged detail view taken in section on the line 18—18 of Fig. 3.

Fig. 19 is a view taken in section on the line 19—19 of Fig. 17.

Fig. 20 is a fragmentary elevation viewed as indicated by line 20—20 of Fig. 3.

Fig. 21 is a view in section along lines 21—21 of Figs. 3 and 22.

Fig. 22 is a view partly in elevation and partly in section along lines 22—22 of Fig. 21.

Figure 1:
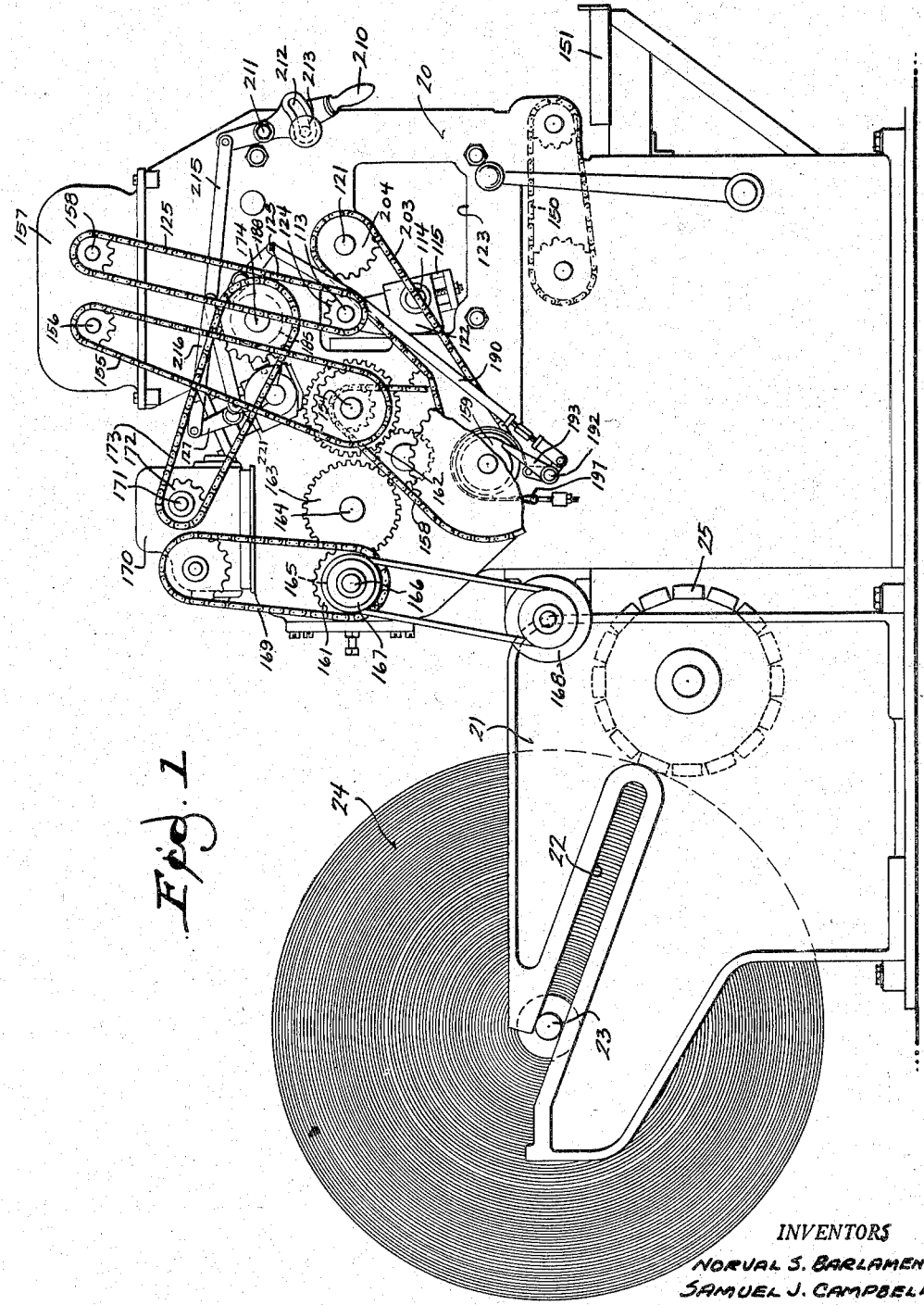
Fig. 1 is a view of the apparatus in side elevation, portions of the driving connections being broken away.

The frame of the rewinder proper is generically designated by reference character 20 and adjacent sub-frame 21 is provided with inclined ways at 22 for the shaft 23 of a web supply roll or parent roll 24 which is operated by means of a cleated drive roll 25 (Fig. 1) against which the periphery of roll 24 rides and toward which the parent roll 24 moves as it is reduced in diameter due to withdrawal of the web therefrom.

The web 30 passes from parent roll 24 about the felt-covered guide roll 31. As best shown at Fig. 18, the shaft 32 which carries this roll has hubs 33 and undercut shear flanges 34 with which coact the trimming disk knives 35 mounted on trimmer roll 36.

As best shown in Fig. 3, the trimmings 26 pass into a housing 27 which preferably has an edge 28 in immediate proximity to roll 36 to act like a doctor blade to scrape off any of the trimmed edges which tend to wind on such roll. An air jet nozzle 29 is directed downwardly through the discharge pipe opening from housing 27 to expedite discharge of the waste strip 26.

The trimmed web passes around the matrix roll 37 to which it is held by the felt-covered roll 38. Perforating knives 39 of the perforating roll 40 penetrate the web and are received into channels 41 of matrix roll 37 in the usual way.

The trimmed and perforated web now passes over the motor-driven and peripherally grooved die roll or drum 45 to be subdivided into individual toilet webs. Projecting into the grooves 46 and cooperating with the adjacent margins of roll 45 are the slitting disks or knives 47, mounted on a shaft 48. The ends of this shaft have floating mountings in spring-supported bearings 49 which are normally held against bias of their respective springs 50 by means of cams 51 on a manually operable cam shaft 52. Upon release of camming pressure, the springs urge the floating bearings 49 upwardly to disengage the knife disks 47 from the roll 45 and thereby to facilitate the threading of the web through the machine. (See Figs. 11 to 13.)

At this point, the individual webs 60 of toilet roll width encounter cores on mandrels carried by endless chains in the manner now to be described.

At opposite sides of the machine frame are the chains 65 and 66 which follow corresponding and generally rectangular paths about upper sprockets 67, 68 and lower sprockets 69 and 70. At intervals, corresponding links of the chains carry chucks 71 (Figs. 21 and 22) each of which is mounted in a bearing in a sleeve 72 telescopically retractable over a boss 73 mounted on one of the chains as best shown in Fig. 21. The guide screws 74 projecting radially from boss 73 are disposed in slots 75 in sleeve 72 to define the reciprocation permitted the sleeve respecting the boss. The sleeve is outwardly biased away from the chain by a compression spring at 77 and it has flanges 78 engageable in the course of chain movement by fixed cams 79 which pull the chucks 71 apart to receive or discharge a mandrel or core shaft 80.

The fixed cams 79 spread the empty chucks 72 in the ascending run of conveyor chain 65 at the rear of the machine until the chucks are opposite saddles 82 onto which loaded core shafts 80 are delivered down the inclined runway 83 as best shown in Figs. 2 and 3. As the chucks come opposite the ends of the saddle-supported core shafts, the chucks are released and engage the core shafts and lift the core shafts and their cores for transportation into the machine. The chuck-retracting cams are further described and illustrated in more detail in connection with a showing in Fig. 4 of similar cams as used in the unloading stages.

As the chains 65 and 66 advance across the top run of their path, the core 85 on each successive mandrel shaft 80 rides onto the knurled driving rings 86 on shaft 87 and concurrently passes beneath the cutting disks 88.

The core slitting disks 88 are so mounted as to be individually yieldable against spring bias and individually adjustable with their respective mountings along the supporting bar 90. Since the several individual mountings for the core slitting disks 88 are of identical construction, the following description of one such mounting will suffice for the purposes of the present disclosure. The structure is best shown in Figs. 3, 4, and 20. The bar 90 has a longitudinal key at 91 loosely engaged by set screws 92 mounted in a collar 93 from which project radially the arms 94 between which one of the disks 88 is confined for rotation upon a shaft 95 fixed in arms 94. The disk thus supported is moved to and from the core shaft 85 to a limit permitted by set screws 92.

Collars 96 are mounted on each side of the oscillatable collar 93 and are fixed to the bar 90 to confine the collar 93 against axial displacement from the position to which it has been adjusted. Each of the collars 96 carries a leaf spring 97 adjustable as to tension by a set screw 98 mounted in an overhanging ear 99 of the collar 96. The free ends of the respective leaf springs 97 bear on the projecting ends of the short shafts 95 of cutter disks 88 to bias the disks toward the successive core shafts 80 as these pass the cores. The cores and core shafts are in rotation by virtue of their engagement with the knurled driving rings on the shaft 87 and the cutter disks are rotated frictionally in contact with the cores as they subdivide the cores into short lengths.

The individual cores, having been slit on the core shaft to toilet roll length as shown at 850 in Fig. 4, are now advanced over the transfer rolls 100, which project slightly through the slotted top 101 of a glue pot 102 electrically heated by resistors 103 (Figs. 3, 14, 15 and 16). The thermostatic switch 104 maintains a uniform temperature as desired. The glue rolls 100 are in the form of disks mounted on shaft 105. The spacing of the disks 100 along the shaft 105 is desirably such that each core 850 will have peripheral ribbons of adhesive somewhere near its respective ends.

As each successive core shaft 80 with its load of glue-coated cores 850 approaches the winding station, the situation is as shown in Fig. 3.

The winding belts 110 (Figs. 3, 4 and 5) operate over upper and lower pulleys 111 and 112, respectively carried by shafts 113 and 114 which have bearings in the winding frame members 115, best shown in Figs. 4 and 5. The upper shaft 113 has its ends mounted in bearings provided by slides 116 for which the machine frame 20 provides ways 117 and 1171 as best shown in Figs. 4, 6 and 7. The lower ways 1171 are supported by brackets 1172 as best shown in Fig. 4.

Thus, the entire winding belt assembly is suspended from slides 116 by means of shaft 113 from which the winding frame members 115 support shafts 114. Each slide 116 carries arm 118 on which there is mounted a cam follower roller 119 in the path of a cam 120 mounted on shaft 121 to displace the slides and the upper winding belt shaft 113 in the manner hereinafter described. The lower winding belt shaft 114 is suspended from the upper shaft 113 by means of the frame members 115 which are disposed in an oblique position according to the work engaged by the belts, the assembly being biased by gravity toward the rolls upon which the belts are operated.

Pressure exerted upon the rolls tends to regulate the tension at which the web is wound. This is defined by the margins of cam plates 122, the shape of which clearly appears in Figs. 3 and 5. These cams are carried from the winding frame members 115 as shown in Fig. 4 and bear on the chucks 72 as shown in Fig. 7 and Fig. 5 to limit the approach of the winding frame to the core shafts 80 as the latter progress through the winding zone.

Shaft 113 is positively driven. As shown in Fig. 4, this shaft may project beyond the slide 116 in which it is mounted, the machine frame 20 having an opening at 123 for the purpose. Externally of the frame, the shaft is provided with a sprocket 124 for driving chain 125 (Figs. 1 and 4). Since the winding belts directly engage the web as it is wound, the rate of belt operation will determine the winding rate of the webs wound on the individual core sections 850.

With the parts in the position shown in Fig. 3, a series of half wound rolls are being engaged peripherally by intermediate portions of the respective winding belts 110. The runs of the respective conveyor chains 65, 66 at the winding station are kept substantially rectilinear by means of chain guides 127 (Figs. 7 and 8). Each chain guide has a pair of chain confining flanges 128, 129 and also an offset flange at 130 which rides against the side of the chuck sleeve 72 of each successive core shaft 80. It will be understood that the chains are in continuous uniform movement at all times so that as the half wound roll is being rotated by the winding hub in the manner shown in Fig. 3, it is constantly advancing downwardly while it increases in diameter.

As the roll shown half wound in Fig. 3 reaches a position opposite the lower winding pulley shaft 114, as shown in Fig. 5, the next core shaft, with its set of empty cores 850 comes opposite the upper winding belt shaft 113. At this point, when one set of rolls is fully wound and the empty cores are available to receive the webs 60, two things happen. In the first place, shaft 121 rotates to engage its cam 120 with cam follower roller 119 whereby to displace the slides 116 to the left as viewed in Fig. 5, whereby the belts 110 passing about pulleys 111 are forced into engagement with the cores 850 to initiate rotation thereof. It will be observed in Fig. 7, which shows the parts at this time, that the lines of glue carried by the cores 850 at 131 are offset from the pulleys so that the belts 110 do not become fouled with adhesive.

The displacement of slides 116 is more than is required merely to engage the belts with the cores 850. In addition, the core and their core shafts are bodily displaced toward roll 45 over which paper webs 60 are trained. The chain guides 127 are bodily yieldable as shown in Fig. 5 and Fig. 6 about pivot pins 126 (Figs. 5, 6, 7, 9) to accommodate this displacement. The guides are provided with cam plates 133 directly engaged by slides 116 to effect such displacement against the tension of springs 134. Thus the glued peripheries of the individual cores 850 are forced into intimate contact with the integrally subdivided webs 60 on roll 45 to adhere the webs to the empty cores.

Simultaneously with the rotation of shaft 121 which has thus brought about the contact of the glued cores with the webs, shaft 135 is rotated to engage its cam 136 with the cam follower 137 carried by a bell crank 138 upon which there is mounted a bumper roll 140 (Fig. 5). The impact of the bumper roll 140 against the fully wound rolls 145 forces the wound rolls and their supporting core shaft 80 and the associated portions of the runs of conveyor chains 65, 66 sharply to the right as in Fig. 5, thus displacing the entire lower end of the winding belt frame including pulleys 112, the lower belt shaft 114 and the winding belts 110. They swing to the right as indicated by the dotted lines in Fig. 5 and are momentarily disengaged completely from the wound rolls 145.

While the bumper roll 140 is free to rotate upon its supporting bar 141, its mass is such that its inertia is not immediately overcome. Accordingly, the frictional contact between this roll and the wound rolls of tissue at 145 abruptly checks the rotation of the rolls 145 and brings about a breakage of the paper webs 60 as indicated at 146 in Fig. 5. Since the severed ends of the webs 60 are already adhered (substantially simultaneously with the breakage) to the individual cores 850, the webs immediately begin to wind on the cores 850 at the point where these are engaged by the belts 110 opposite the upper winding shaft 113.

Meantime, the conveyor chains 65, 66 have, of course, continued to advance so that, by the time the winding belt frame swings back toward the full line position of Fig. 5, the fully wound rolls 145 will already be largely beyond the perimeters of the pulleys 112. Even if the belts reengage with the fully wound rolls, no particular damage is done and the wound rolls will almost immediately clear the belt and the bumper roll 140.

The latter will, of course, be retracted to the position of Fig. 3 as soon as cam 136 clears the cam follower 137, the bell crank 138 being subject to the bias of retracting spring 148. After the fully wound rolls 145 and their core shaft 80 have passed with the conveyor chains around the lower sprockets 69, the flanges 78 of the chuck bearing sleeves 72 engage the fixed cams 149 (Figs. 2, 3 and 4) whereby the chucks are retracted as shown in Fig. 4 to drop the shaft 80 and its load of fully wound rolls 145 onto the chains 150 of the discharge conveyor from which they may be delivered onto any suitable receiver such as the rack 151 shown in Fig. 2.

The cycle of operation has now been completely described. While a wide variety of means may be employed to actuate the parts, the driving mechanisms actually used will be described.

The main driving motor 153 (Fig. 2) primarily actuates shaft 154 upon which the die drum 45 is mounted. This drive is at the far side of the machine as viewed in Fig. 1 and Fig. 2. On the front side of the machine (Fig. 1), shaft 154 is connected by chain 155 with the input shaft 156 of an infinitely variable speed changer set 157, the output shaft 158 of which is connected by chain 125 with sprocket 124 on the upper winding belt shaft 113.

Also driven from the primarily motor operated shaft 154 by means of chain 158 (Fig. 9) is a clutch 159 which, when engaged, operates the cam shaft 135 upon which the cams 136 are mounted, these being the cams which actuate the bumper roll 140 to and from engagement with the wound toilet rolls to break the web. The means by which the clutch 159 is engaged and disengaged is shown in Fig. 10 and will later be described in connection with another train of operating connections.

Also driven from shaft 154 through an idler gear 162 (Fig. 1) is the gear 163 on the perforator matrix shaft 164 which carries matrix roll 37. Gear 163, in turn, meshes with a gear 165 on the perforator shaft 166 which carries the perforator 40 (Figs. 3 and 17). Carried by shaft 166 is a sprocket 161 which may be driven for indexing purposes through the overrunning clutch 167 from indexing motor 168. With the main motor 153 in operation, the indexing motor 168 is at rest. However, with the main motor at rest, motor 168 may be used to operate the sprocket 161 through the overrunning clutch 167 whereby to drive through chain 169 the rate changer 170. The output shaft 171 of this rate changer has a sprocket 172 connected by chain 173 (Fig. 1) with the shaft 174 which carries sprockets 68 which drive the conveyor chains 65 and 66 (Figs. 9 and 3).

The perforator shaft 166 carries at the end opposite its driving gear 165 a gear 175 (Fig. 17) with which meshes a gear train comprising gears 176 and 177. These gears are respectively mounted on shafts 32 and 180. Shaft 32 carries the shear flanges 34 with which the trimming disks 35 coact as best shown in Fig. 18 and already described. It should be noted, however, that the hub 33 of felt-covered roll 31 carries a collar 181 which has a rubber jacket at 182, while shaft 180 has a complementary collar at 183 likewise provided with a rubber jacket at 184. While the rolls 31 and 36 are spaced apart to provide clearance for the web 30, the rubber jacketed collars 181 and 183 are in pressure engagement with the material at the margins of the web which is being severed from the web by interaction of the shearing disks 35 with the shear flanges 34. Thus the edge waste is securely held in the bite of the rubber covered collars on shafts 32 and 180 and its movement into the receptacles 27 is thus assured, notwithstanding that the web 30 is passing around the felt-covered roll 31 enroute to the perforator.

The drive is as follows to the cam 136 which periodically urges the bumper roll against the wound rolls to break the web:

Shaft 174, driven from rate changer 170 as shown in Fig. 1 and above described, carries disk 185 (Fig. 10) upon which are diametrically opposite cam fingers 186. This shaft is the same which carries sprocket 68 for driving the conveyor chains and the timing is such that the shaft makes one-half rotation for each completed set of rolls. Thus, as each progressively advancing set of rolls reaches full diameter as shown in Fig. 3, one or the other of the cam fingers 186 strikes the cam follower 187 at the end of lever 188 to oscillate this lever and transmit motion through the connecting rod 190 to the arm 191 of rock shaft 192. This rock shaft has a stop dog 193 for the "Hilliard" single revolution clutch 159 and it also has brake arms 194 cross connected by a pin 195 to which is fastened the strap at the free end of the brake band 196. The other end of the brake band is anchored at 197 (see Fig. 9).

Upon each completion of the rolls on a given core shaft, the oscillation of lever 188 communicates motion to oscillate the rock shaft 192, first turning the same in a direction which is clockwise as viewed in Fig. 10, and immediately thereafter in the opposite direction. This releases the clutch stop dog 193 from the shoulder 200 of the clutch 159 whereby the clutch engages and rotates clockwise 360° to transmit motion from chain 158 to cam shaft 135. Since the brake band 196 is concurrently released from the brake drum 201, the cam shaft is free to rotate. The progressively decreasing radius of the clutch leading to shoulder 200 permits the gradual application of braking pressure to the drum 201 until at the conclusion of a single rotation of the shaft 135 the clutch comes to rest with the shoulder 200 abutting the stop dog 193. Meantime, the bumper roll 140 will have engaged the finished toilet roll to break the web as already described.

Connected with the cam shaft 135 to be actuated concurrently therewith upon each release of the single revolution of clutch 159 is a sprocket 202 (Fig. 9) having driving connection through the chain 203 with sprocket 204 (Fig. 1) on shaft 121 which carries the cams 120 to displace the chain guides and shift each successive mandrel bodily toward roll 45 as shown in Figs. 5, 6 and 7 and above described. Thus the pressure engagement of the glue-bearing empty cores with the web is made to occur concurrently with the breaking of the web consequent upon striking of the full rolls by the bumper roll 140 as shown in Fig. 5.

Shaft 174, which carries the conveyor drive sprockets, projects beyond the frame 20 as shown in Fig. 4 to carry a cam disk 207 which has on its periphery pegs at 208 and 209 for engaging the switch 210 for starting and stopping the motor 211 (Fig. 2). This motor drives through chain 212 the hereinbefore mentioned shaft 87 which is geared to the shaft 105 upon which the gluing disks 100 are mounted, as shown in Figs. 14 to 16. There is no particular reason why the gluing disks should not be in continuous rotation. Hence, the driving connections are shown merely to illustrate the machine as built. The final gear in the train driving the shaft 105 is shown at 214 in Fig. 14.

Adjustment of the slitting knives 47 to and from contact with the undercut shoulders at 46 is made manually and is an important feature of the present invention. The hand lever 210 (Fig. 1) is pivoted at 211 and has an arcuate slot 212 accommodating the shank of a clamp bolt 213 which limits hand oscillation and also secures it in adjustment.

Link 215 has an extension 216 which connects the free end of the hand lever with the arm 217 of the rock shaft 52 which carries the cams 51 to urge the bearing boxes 49 downwardly in the ways 218 (Fig. 11 and Fig. 12). As already stated, the bearing boxes 49 are supported by springs 50 against cams 51. Stops 219 adjustably limit their downward movements to define the engagement between the knives 47 and the shouders 46.

Coincidentally with their movement into and from the annular channels of roll 45, the knives are also required to move axially to and from engagement with shoulders 46. To this end, the mounting shaft 48 has its bearing mounted in sleeves 220 axially movable in the boxes 49. For effecting the axial movement, the sleeve 220 in which the bearing is mounted at the left in Fig. 11 is provided with a radially projecting arm 221 with which the end of link 215 is connected as best shown in Fig. 12. At the base of this arm, a helical cam groove 222 is cut as shown in Fig. 11 and this groove coacts with a fixed pin 223 carried by an ear 224 fastened to the frame. Thus, the movement of the handle lever 210 in one direction moves the slitting disks 47 axially away from the shoulders 46 and out of the respective channels of roll 45, the retracted position of the parts being illustrated in Fig. 13. Movement in the opposite direction restores the slitting disks to the position shown in Fig. 11.

The feeding drum 25 is driven by chain 225 from the primary motor driven roll shaft 154, as best shown in Fig. 2. The lineal movement of the web 30 from the supply roll 24 is the same as the lineal movement of the web over roll 45, from which it is supplied to the core tubes.

In paper converting equipment, difficulty has sometimes been experienced due to the winding of the web on the perforator. The present device affords an important means for guarding against damage in the event of such winding. The switch 230 (Figs. 17 and 19) controls the main motor 153, from which the machine is either driven or controlled. This switch has its actuator 231 in the path of a rocker arm 232 carried by rock shaft 233. This rock shaft is free to rotate but normally is idle, being maintained in the position shown by the weight of the arms 234 which support fingers 235 between the axially spaced knives 39 on the perforator 40 (compare Figs. 3 and 17).

As long as the perforator knives are operating properly, the space between knives will be entirely clear, as shown in Fig. 17. However, with the first accumulation of web upon the knives, the engagement of the web with the fingers 235 during rotation of the perforating roll 40 will displace the rock shaft 233 and open the normally closed switch 230 to bring the entire machine to a stop before any damage is done.

To thread the web through the machine in the first instance, the perforating roll 40 is backed off in ways provided for it as best shown in Fig. 3 to leave clearance between the knives and the matrix roll 37. The web is then passed between the trimmer roll 36 and about the felt-covered roll 31 and about the matrix roll 37 between the latter and the perforating roll 40 and felt-covered roll 38.

Thence the web passes over the grooved die roll 45 from which the slitting knives 47 are retracted during threading by manipulation of the handle 210. The conveyor chains being properly loaded with core shafts bearing cores having glue applied in annular bands to their peripheries as above described, the ends of the subdivided web can be attached to individual cores and the slitting and perforating knives engaged in readiness for operation.

The machine is then started and its continued operation is automatic, a freshly loaded core shaft being picked up by the chucks of the conveyors and carried over the gluing apparatus while the cores on preceding core shafts are being moved downwardly through the winding zone and rotated by the belts 110. As each set of cores becomes fully wound, the bumper roll automatically goes into operation to break each web and, at the same time, the cam 120 displaces the conveyor chains bodily to bring a freshly glued set of rolls into contact with the broken web to pick up the broken webs thereof and resume winding. The discharge of the successive core shafts with their fully wound rolls is just as automatic as the loading, the chuck being withdrawn during the progress of the conveyor chains to drop the loaded core shaft, whereupon an operator can strip the full rolls and replace empty cores upon the shaft for restoration to the machine.

We claim:

1. In a machine for winding web upon a core, the combination with web supplying means from which the web is delivered for winding, a core shaft upon which a web receiving core is mounted and conveyor means supporting the core shaft for movement past said supplying means, of a winding belt disposed opposite said supplying means and extending along the path of core shaft advance in a position to act on the periphery of a core and the roll formed on the core to effect winding rotation, means for actuating said belt in a web winding direction, and a support for the winding belt bodily movable to and from the supplying means.

2. The device of claim 1 in which the winding belt support comprises a sub-frame having pulleys over which the winding belt is trained, bearing slides reciprocable to and from the roll and to which the sub-frame is pivoted adjacent one end, the other end portion of the sub-frame being biased toward the path of advance of the core shaft and a roll being wound by said belt upon a core carried by the core shaft, said other sub-frame end portion being yieldable as the diameter of such roll increases.

3. The device of claim 1 in further combination with means for arresting rotation of a completely wound roll, a second core carrying core shaft mounted on said conveyor means, means for rendering the core on said second core shaft adhesive, and means for displacing the winding belt and said second core shaft bodily toward said roll to engage the adhesive core on the second core shaft with the web intermediate said supplying means and the roll mounted on the first core shaft.

4. The device of claim 3 in further combination with cams for the operation of the means which displaces the winding belts and the means which arrests rotation of a fully wound roll, actuating connections common to the said cams, and means for intermittently causing said actuating connections to operate in synchronism with the movement of said conveyor means.

5. The device of claim 3 in which the means for arresting movement of the fully wound roll comprises a bumper roll having substantial inertia and movable to and from engagement with a fully wound roll as the latter is advanced by said conveyor means, and means for advancing the bumper roll toward such engagement with sufficient impact to cause the winding belt to swing momentarily from winding engagement with said roll.

6. In a machine for winding a continuously moving web into a succession of rolls upon cores carried by successive core shafts, the combination with a drum over which the web is trained, of a pair of laterally spaced conveyor chains having opposing core shaft chucks and guide means supporting the chains for corresponding movement upon closed paths, a succession of core shafts carried by consecutive chucks and movable past said drum in the course of conveyor chain advance, glue applicators adjacent the path of core shaft movement for applying glue to cores carried by the successive shafts as they approach said drum, a winding belt having a run extending along the path of advance of individual cores carried by successive shafts for the rotation of said cores to effect the winding of web thereon, the path of core movement upon the respective core shafts carried by the conveyor chains being between said drum and the winding belt, a sub-frame provided with pulleys for the winding belt, and supports for the sub-frame upon which the sub-frame is bodily movable toward said drum to effect engagement between the glued portions of said cores and a web supplied over said drum, and means for periodically displacing toward said drum said sub-frame and the successive cores engaged by said belts and the core shafts upon which the cores are mounted and the portions of said chains which carry the chucks for said shafts, whereby to adhere portions of a web to each successive core.

7. The device of claim 6 in further combination with a bumper roll movable to and from the path of a fully wound roll of web and means for actuating the bumper roll into engagement with the periphery of each successive wound roll of web substantially concurrently with the said displacement of a glued core and its shaft into contact with the web.

8. In a machine for winding web continuously upon a succession of cores carried by successive core shafts, the combination with laterally spaced conveyor chains provided with corresponding core shaft chucks, means for supplying to successive chucks core shafts loaded with cores, means for discharging from successive chucks core shafts upon which rolls of said web have been wound, web supplying means, glue pot and applicator means adjacent the path of advance of the cores of loaded core shafts for rendering such cores adhesive, and means for adhering to said cores and winding thereon the web continuously delivered by said supplying means, said adhering and winding means comprising a sub-frame, pulleys spaced on the sub-frame along the path of advance of loaded core shafts past said supplying means, winding belt means operating over said pulleys, means for actuating one of said pulleys and said belt means in a direction to wind upon successive cores web engaged by said belt means, bearing supports for the sub-frame, ways extending toward and from the web supplying means and in which the bearing supports are movable, of the sub-frame being pivotally movable respecting the bearing supports and being subject to bias toward the path of advance of the core shafts and cores whereby to maintain winding runs of the winding belt means in engagement with rolls being wound upon successive cores, and means operable in synchronism with core shaft advance for periodically effecting movement of said bearing means toward the web supplying means for engaging the adhesive periphery of empty cores with portions of web delivered by the supplying means and for substantially concurrently causing the severance of the web between those cores engaged therewith and cores upon which web has previously been wound.

9. The device of claim 8 in which the web severance means comprises a bumper roll mounted for bodily movement toward and from the path of advance of rolls of said web, said bumper roll being mounted for rotation and having substantial inertia sufficient to occasion the momentary stopping of rotation of successive wound rolls of the web and the displacement of the winding belt means from contact with such wound rolls.

10. The device of claim 8 in which each core shaft carries a plurality of cores.

11. In a machine of the character described in which core shafts and bearing cores are successively moved between a web supplying drum and a sub-frame which supports a winding conveyor, the sub-combination which comprises ways at opposite ends of the sub-frame, bearing supports slidable in the ways and upon which the sub-frame is pivoted adjacent one end, conveyor chains upon which successive core shafts are mounted for movement aforesaid, guides for the chains movable with the bearing supports toward and from the web supplying drum, and means for periodically displacing the bearing supports and chain guides toward the drum in the course of conveyor chain advance.

12. The device of claim 11 in further combination with web severing means mounted for movement in opposition to the direction of movement of said bearing supports and spaced from said bearing supports in the direction of conveyor chain advance in a position to engage fully wound rolls, and actuating connections for the advance of the web severing means in opposition to the advance of the bearing supports and substantially concurrently whereby to sever the web passing through successive fully wound rolls substantially concurrently with the engagement of successive empty cores with the same web.

13. In a machine for winding a web successively upon a number of cores, the combination with web treating means, of a succession of core shafts, conveyor means upon which the core shafts are mounted for movement transversely of the web supplied by the supplying means, said conveyor means comprising laterally spaced flexible members spanned by the core shafts, yieldably mounted guides with respective flexible members, means for effecting web winding upon successive core shafts, and means for moving the guides and portions of the flexible conveyor members and a core shaft extending therebetween toward the path of a web delivered by said supplying means for engaging such web to effect an initiation of a winding operation.

14. The device of claim 13 in which the means for winding comprises winding belt means extending along the path of core shaft movement with said conveyor members, the winding belt means including a run positioned for engagement with the periphery of the core shaft and web wound thereon, together with means for operating said winding belt in a direction to wind additional web upon the core shaft.

15. In a device of the character described, the combination with a machine frame having conveyor supports at opposite sides, of flexible conveyors trained over said supports upon corresponding closed paths, chucks including retractable members mounted on the respective conveyors, means in the path of the retractable members for retracting and releasing such members in accord with conveyor movement, core shaft feeding and withdrawing supports for holding the successive core shafts to be picked up by the retractable members of said chucks for movement with the conveyors and for receiving core shafts from said chucks at another point in the movement of the conveyors, means in the path of core shaft movement for applying glue to cores on successive shafts, web feeding means, conveyor guides through which the conveyors pass adjacent the point of web delivery from said web feeding means, winding belts provided with a sub-frame having mountings movable with the respective guides toward and from said web feeding means, said sub-frame being pivotally movable with respect to said mounting and having pulleys over which feeding belts are trained in positions to engage cores and webs wound on cores as delivered from said web feeding means, mechanism for displacing the mounting means and conveyor guides toward the web feeding means to engage glued cores with the web delivered by said means to initiate winding, the winding continuing during the advance of successive core shafts along the path of movement of the winding belts supported by the sub-frame, the sub-frame being biased by gravity toward engagement with rolls of web wound on the cores of the core shaft, means for mechanically limiting pressure of the winding belt on such rolls, and means for arresting rotative movement of rolls wound on said cores substantially coincidentally with movement of the conveyor guides and sub-frame mountings toward the delivered web to initiate a new winding operation.

References Cited in the file of this patent
UNITED STATES PATENTS

| | | |
|---|---|---|
| 564,899 | Rahm | July 28, 1896 |
| 838,147 | Sturgis | Dec. 11, 1906 |
| 840,592 | Stacy | Jan. 8, 1907 |
| 1,244,005 | Von Pein | Oct. 23, 1917 |
| 1,690,410 | Hudson | Nov. 6, 1928 |
| 1,741,520 | Jagenberg | Dec. 31, 1929 |
| 1,958,068 | Raiche | May 8, 1934 |
| 2,237,759 | Kwitek | Apr. 8, 1941 |
| 2,507,144 | Christman | May 9, 1950 |
| 2,621,736 | Scruggs et al. | Dec. 16, 1952 |
| 2,668,675 | Wolfe | Feb. 9, 1954 |